(12) United States Patent
Provaznik

(10) Patent No.: US 9,712,379 B2
(45) Date of Patent: Jul. 18, 2017

(54) ROBUST CLOUD INSTANCE LAUNCHING

(71) Applicant: Red Hat, Inc., Raleigh, NC (US)

(72) Inventor: Jan Provaznik, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 501 days.

(21) Appl. No.: 13/750,770

(22) Filed: Jan. 25, 2013

(65) Prior Publication Data

US 2014/0215049 A1 Jul. 31, 2014

(51) Int. Cl.
*G06F 15/177* (2006.01)
*H04L 12/24* (2006.01)
*G06F 9/455* (2006.01)
*H04L 29/08* (2006.01)
*G06F 11/14* (2006.01)
*G06F 9/50* (2006.01)

(52) U.S. Cl.
CPC ...... *H04L 41/0663* (2013.01); *G06F 9/45558* (2013.01); *G06F 11/1484* (2013.01); *H04L 41/5096* (2013.01); *H04L 67/1097* (2013.01); *G06F 9/5072* (2013.01); *G06F 2009/45575* (2013.01)

(58) Field of Classification Search
CPC ............. H04L 12/2602; G06F 11/1484; G06F 2009/4557; G06F 2009/45575; G06F 9/5072

USPC ......................................................... 709/220
See application file for complete search history.

(56) References Cited

U.S. PATENT DOCUMENTS

| | | | | |
|---|---|---|---|---|
| 8,332,688 | B1 * | 12/2012 | Tompkins ........................ | 714/13 |
| 8,560,699 | B1 * | 10/2013 | Theimer et al. .............. | 709/226 |
| 2008/0189468 | A1 * | 8/2008 | Schmidt et al. .................. | 711/6 |
| 2009/0144579 | A1 * | 6/2009 | Swanson ........................... | 714/3 |
| 2011/0035620 | A1 * | 2/2011 | Elyashev et al. ................ | 714/4 |
| 2011/0265168 | A1 * | 10/2011 | Lucovsky ........... | H04L 63/0245 726/7 |
| 2012/0117555 | A1 * | 5/2012 | Banerjee ................... | G06F 8/65 717/168 |
| 2014/0040473 | A1 * | 2/2014 | Ho et al. ....................... | 709/226 |
| 2014/0201564 | A1 * | 7/2014 | Jagtiani et al. .............. | 714/4.11 |

* cited by examiner

*Primary Examiner* — Phuoc Nguyen
(74) *Attorney, Agent, or Firm* — Lowenstein Sandler LLP

(57) ABSTRACT

A method and system for receiving a request to deploy virtual machine instances on a first cloud and determining whether the deployment has been prepared for launch on cloud. Upon determining that the deployment has not been prepared for launch, aborting a launch of the deployment is initiated. Upon determining that the deployment has been prepared for launch, a launch of the deployment on the cloud is initiated. Upon determining that the launch of at least one of the virtual machine instances has failed to launch, a re-launch of the at least one instance that has failed to launch is initiated or a rollback of the deployment is initiated.

20 Claims, 5 Drawing Sheets

ROBUST CLOUD INSTANCE LAUNCHING

TECHNICAL FIELD

Embodiments of the present disclosure relate to cloud computing and, more particularly, to a technique of launching a deployment of one or more virtual machines deployed as a group in a cloud.

BACKGROUND

Cloud computing is generally becoming the platform of choice for businesses that want to reduce operating expenses and be able to scale resources rapidly. Eased automation, flexibility, mobility, resiliency, and redundancy are several of the advantages of moving resources to the cloud. Many organizations are being introduced to cloud computing by building an on-premise Infrastructure-as-a-Service (IaaS) cloud, which delivers computing, storage, and networking resources to users. Virtual machines in cloud computing are, for the most part, ephemeral. The state of a virtual machine is not persistent and is lost at shut down. A set of virtual machines can be launched with a particular configuration in a cloud one day and can be launched in a different cloud environment the next day. However, some of the virtual machines of the set may not successfully launch.

BRIEF DESCRIPTION OF THE DRAWINGS

Various embodiments of the present disclosure will be understood more fully from the detailed description given below and from the accompanying drawings of various embodiments of the invention.

DETAILED DESCRIPTION

Embodiments of the disclosure are directed to a method and system for robust cloud instance launching. A launch server is provided to determine whether a cloud meets prerequisites for launching the deployment. The launch server determines whether a deployment of instances has been prepared for launch on the cloud. If the deployment has not been prepared for launch, the launch is aborted or, if the deployment has been prepared for launch, a launch of the deployment is initiated on the cloud.

In one embodiment, whether one of the instances failed to launch on the cloud is determined. If an instance failed to launch, a relaunch of the instance can be initiated on the cloud, according to a user selection. The launch server can determine whether one of the instances failed to relaunch on the cloud. If one instance failed to relaunch, a rollback of the deployment can be initiated, according to a user selection. A launch of the deployment can be initiated on another cloud, according to a user selection. A launch status can be displayed, according to a user selection. The method and system provide an automatic retry or fallback plan if an error occurs during the phases of a launch of a deployment, rather than merely permitting the deployment to be launched with errors.

Figure 1:
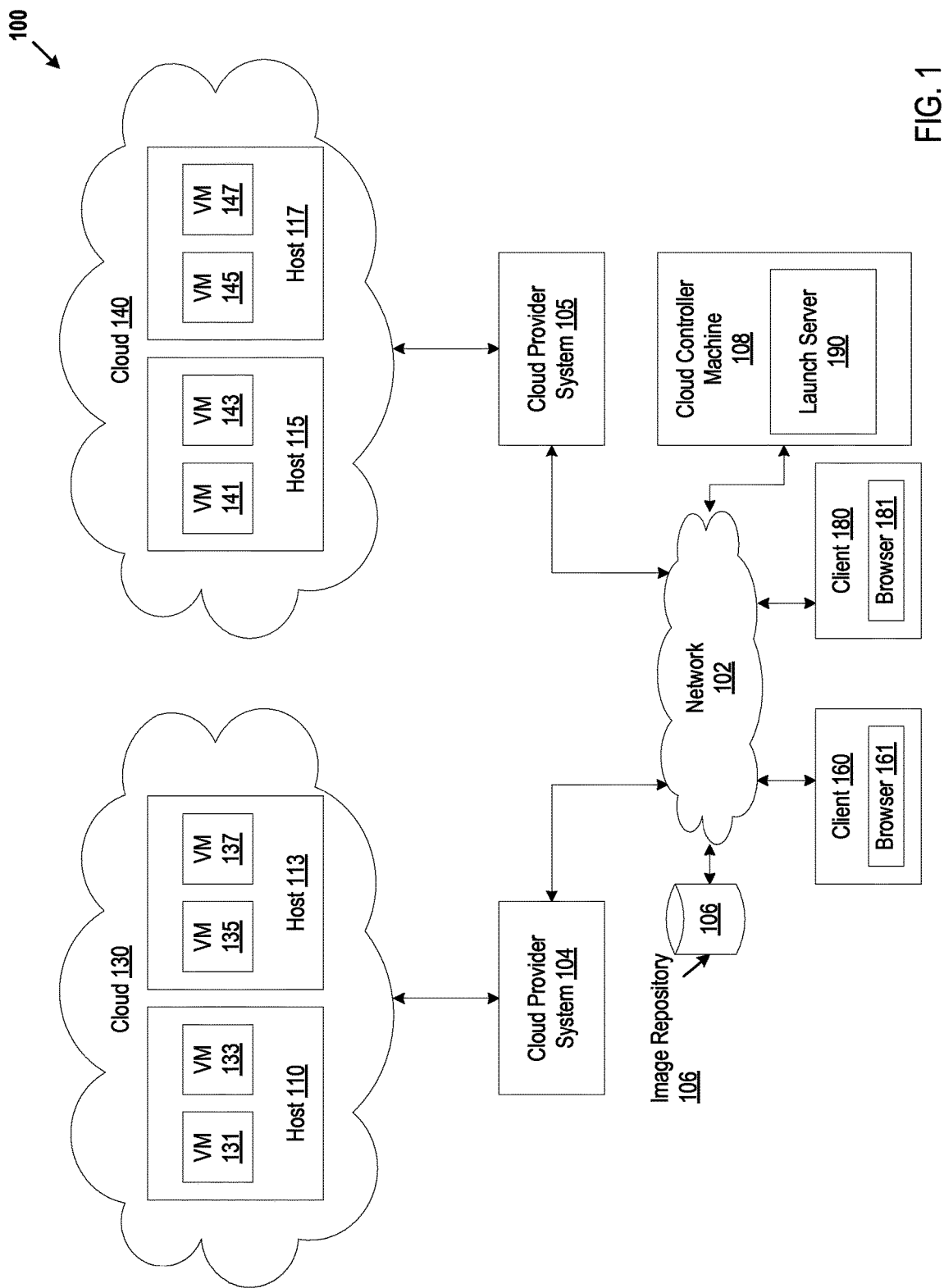
FIG. 1 illustrates exemplary system architecture, in accordance with various embodiments of the present disclosure.

FIG. 1 is a block diagram of a network architecture 100 for a distributed computing system, in which embodiments of the invention may operate. The network architecture 100 can include multiple clouds (networks of computing resources) 130, 140 managed by various cloud provider systems 104, 105. There can be any number of clouds 130, 140 and cloud provider systems 104, 105. For brevity and simplicity, two clouds 130, 140 are used as an example throughout this document. In an embodiment, the network architecture includes clouds from multiple cloud providers, and multiple clouds can be provided by a cloud provider. The clouds 130, 140 provide virtual machines. There can be any number of virtual machines in a cloud 130, 140. For brevity and simplicity, four virtual machines in each cloud 130, 140 are used as an example in architecture 100. For example, cloud 130 provides virtual machines 131, 133, 135, and 137, and cloud 140 provides virtual machines 141, 143, 145, and 147. Each virtual machine is hosted on a physical machine configured as part of the cloud 130, 140. Such physical machines are often located in a data center. For example, virtual machines 131 and 133 are hosted on host 110 in cloud 130 provided by cloud provider system 104, virtual machines 135 and 137 are hosted on host 113 in cloud 130 provided by cloud provider system 104, virtual machines 141 and 143 are hosted on host 115 in cloud 140 provided by cloud provider system 105, and virtual machines 145 and 147 are hosted on host 117 in cloud 140 provided by cloud provider system 105.

The cloud provider systems 104, 105 and clouds 130, 140 may be provided as an infrastructure as a service (IaaS) layer. The cloud provider systems 104, 105 and clouds 130, 140 may be provided by, for example, a third party cloud provider or an organization including consumers of cloud 130, 140. For example, cloud provider system 104 and cloud 130 may be provided by Cloud-Provider-1, and cloud provider system 105 and cloud 140 may be provided by Cloud-Provider-2. A cloud provider can provide more than one type of cloud provider system 104, 105 and more than one type of cloud 130, 140. The cloud provider can be an entity. An entity, as referred to here, can represent any person, a business organization such as a corporation, an educational institution such as a college or university, etc. Users can interact with applications executing on cloud-based virtual machines using client computer systems, such as clients 160, 180, via corresponding web browser programs 161, 181. Users may have one or more accounts associated with a cloud provider system 104, 105.

Clients 160, 180 are connected to hosts 110, 113, 115, 117 and cloud provider systems 104, 105 via a network 102, which may be may be a private network (e.g., a local area network (LAN), a wide area network (WAN), intranet, or other similar private networks) or a public network (e.g., the Internet). Each client 160, 180 may be a mobile device, a PDA, a laptop, a desktop computer, or any other computing device. Each host 110, 113, 115, 117 may be a server computer system, a desktop computer or any other computing device. The cloud provider system 104, 105 may include one or more machines such as server computers, desktop computers, etc.

In one embodiment, the cloud provider system 104, 105 is coupled to a cloud controller machine 108 and a launch server 190 via the network 102. The cloud controller machine 108 and launch server 190 may reside on the same machine or different machines (e.g., server computers, desktop computers, etc.). The cloud controller machine 108 and launch server 190 may be maintained by a cloud consumer of cloud 130, 140 such as an enterprise (e.g., business, company). In another embodiment, the cloud controller machine 108 and launch server 190 may be maintained by a third party cloud provider. In yet another embodiment, the cloud controller machine 108 and/or launch server 190 may be part of the cloud provider system 104, 105.

The cloud controller machine 108 may manage the execution of applications in the cloud 130, 140. The cloud controller machine 108 may receive input, for example, from a system administrator via a client 160, 180, describing VMs 131, 133, 135, 137, 141, 143, 145, 147 to be deployed in the cloud 130, 140 for execution of the applications. A VM may execute one or more applications. Alternatively, several VMs may be used to execute a single application (a composite application), with each virtual machine executing one or more components of a composite application. An image repository 106 can be populated with application deployment data to be used to deploy the VMs 131, 133, 135, 137, 141, 143, 145, 147. In one embodiment, the cloud controller machine 108 generates the application deployment data based on the user input and stores the application deployment data in the image repository 106. The repository 106 may reside locally or remotely and may represent a single data structure or multiple data structures (databases, repositories, files, etc.) residing on one or more mass storage devices, such as magnetic or optical storage based disks, solid-state drives (SSDs) or hard drives.

The application deployment data can be described in a structured format that specifies the bootable operating system, along with any software requirements, such as additional software packages to be installed, beyond the base operating system, additional configuration which may be required, for example, network ports on which services should be made available, and specific targeting information to instantiate a virtual machine, for example, a hardware profile, which specifies an amount of RAM, and a number of virtual CPUs. The application deployment data can be a hierarchy of data that includes deployables, assemblies, and templates. Each deployable describes an overview of one or more virtual machines to be deployed as a group. A deployable can describe any number of arbitrarily large and complex deployments of virtual machines or a small number of virtual machines. A deployable can be described by an XML file.

An assembly is a description of a virtual machine to be deployed. An assembly can be described by an XML file. An assembly can include the description of a service to be provided by a virtual machine, the description of a service to be used by a virtual machine, and the description of one or more parameter values to be provided to or relied upon by a virtual machine. The following is an example of a deployable definition, including assemblies:

```
<?xml version="1.0"?>
<deployable version="1.0" name="test">
<description/>
<assemblies>
<assembly hwp="small-x86_64" name="test1">
<image id="aeaeb15e-1eb3-11e2-b10e-52540028e9a5"/>
</assembly>
<assembly hwp="small-x86_64" name="test2">
<image id="aeaeb15e-1eb3-11e2-b10e-52540028e9a5"/>
</assembly>
```

```
<assembly hwp="small-x86_64" name="test3">
<image id="/aeaeb15e-1eb3-11e2-b10e-52540028e9a57>
</assembly>
</assemblies>
</deployable>
```

A template is a description of a disk image and meta-data for creating a virtual machine image. A virtual machine image can be created based on a template. A virtual machine image can be launched to instantiate (create) a virtual machine in a cloud. A template can be described by an XML file. The following is an example of an image template:

```
<template>
<name>f15jeos</name>
<os>
<name>Fedora</name>
<version>15</version>
<arch>x86_64</arch>
<install type='url'>
<url>http://download.devel.redhat.com/released/F-15/GOLD/Fedora/x86_64/os/</url>
</install>
<rootpw>test</rootpw>
</os>
<description>Fedora 15</description>
</template>
```

Returning to FIG. 1, upon receiving a command identifying a specific deployable to launch, the cloud provider system 104, 105 retrieves a reference to the existing image for each virtual machine available to be run/cloned on top of a hypervisor (not shown). If the image is not in the image repository 106, other elements may be used to place the image in the repository 106. For example, images can be saved in an image repository by an image factory component, which builds and uploads images to particular providers. The command may be received from the cloud controller 108 or a user (e.g., a system administrator) via a console computer or a client machine. The images can be launched in the cloud 130, 140 to instantiate the virtual machines 131, 133, 135, 137, 141, 143, 145, 147 for the deployable. Launch of a virtual machine can include powering on or booting a virtual machine.

The launch server 190 can detect the VMs 131, 133, 135, 137, 141, 143, 145, 147 that have been started (e.g., powered on or booted) for a deployable. The launch server 190 can communicate with agents running in the VMs and with the image repository 106 to retrieve application deployment data. When a virtual machine image is launched (e.g., powered-on, booted) on a host in the cloud 130, 140, the agent executes in a corresponding virtual machine to communicate with the launch server 190.

The launch server 190 determines whether a deployment of one or more instances (e.g., virtual machines) has been properly prepared for launch on a particular cloud provider 104, 105 in a cloud 130, 140. Upon determining that the deployment has not been prepared for launch, the launch server 190 aborts the launch of the deployment. Upon determining that the deployment has been prepared for launch, the launch server 190 can initiate a launch on the cloud.

Figure 2:
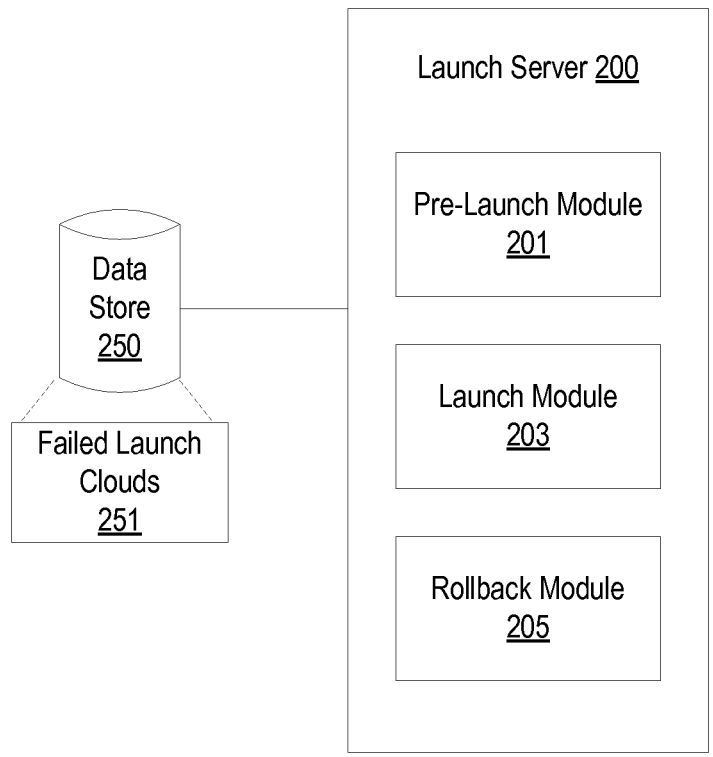
FIG. 2 is a block diagram of a launch server, in accordance with an embodiment.

FIG. 2 illustrates a block diagram of one embodiment of launch server 200. In one embodiment, the launch server 200 can be the same as the launch server 190 of FIG. 1. Launch server 200 includes a pre-launch module 201, a launch module 203, and a rollback module 205. Note that in alternative embodiments, the launch server 200 may include more or less modules than those shown in FIG. 2. Also, one or more of the pre-launch module 201, launch module 203 and/or rollback module 205 may be combined into a single module. Additionally, the functionality of any of the pre-launch module 201, launch module 203, and rollback module 205 may be divided between multiple modules.

In one embodiment, pre-launch module 201 determines whether a deployment of one or more instances has been properly prepared for launch. A proper preparation can include determining that the quota of running instances was not reached, that hardware profiles referenced by the deployable exist, and that there is a suitable provider for all of the instances. For example, prior to launching a deployment, a deployment object is created, and instance objects are created and associated with the deployment object. Deadlocks in instance parameters may also be determined and resolved. For example, there can be some dependencies between instances such that some services may depend on values from other instances, so dependent instances should be launched after those values become available. Further, launch parameters are computed for all of the instances for uploading to a configuration server (not shown). The pre-launch module 201 determines whether all of the processes necessary to properly prepare a deployment for launch have successfully occurred.

In one embodiment, the pre-launch module 201 also determines whether a cloud is a suitable match (i.e., meets the prerequisites) for the deployment, and/or that a matching cloud has been selected. For example, these requirements may include a matching provider hardware profile (e.g., the cloud can launch virtual machines whose attributes, such as RAM and virtual CPUs, are a close approximation of the attributes requested by the launcher), a matching provider realm (e.g. the specified range of permissible environments in which the deployment could be launched includes at least some sub-component of the hosting capacity presented by the cloud), and a matching provider account. Once a match is determined, launch parameters are determined for all of the instances. For example, the launch parameters can include:

```
<parameter name="wp_name">
    <value>wordpress</value>
</parameter>
<parameter name="wp_user">
    <value>wordpress</value>
</parameter>
<parameter name="wp_pw">
    <value>wordpress</value>
</parameter>
<parameter name="mysql_ip">
    <reference assembly="mysql" parameter="ipaddress"/>
</parameter>
<parameter name="mysql_hostname">
    <reference assembly="mysql" parameter="hostname"/>
</parameter>
<parameter name="mysql_dbup">
    <reference assembly="mysql" parameter="dbup"/>
</parameter>
```

In an embodiment, if the pre-launch module 201 determines that there are deficiencies in the preparation of the deployment for launch, then the launch can be aborted. If the pre-launch module 201 determines that the deployment has been properly prepared, then the launch server 200 proceeds to initiate a launch of the deployment.

The launch module 203 initiates a launch of the instances of the deployment on the selected cloud. For example, the launch can be done as a background job by a background job tool. The instance launch parameters are uploaded to the configuration server. In one example, a delta cloud application programming interface (DC-API) creates instance requests for each instance that is sent. In another example, launch requests can be sent directly to the provider.

In one embodiment, rather than setting a create_failed state attribute for the deployment when one or more of the instances fail to launch and continuing to attempt to launch other instances, the launch module 203 can initiate a stopping of the launch of the deployment when an instance fails to launch. In one embodiment, the launch module 203 can initiate a relaunch of the instances that failed to launch, according to a user selection. In other words, a user can select whether the launch module 203 should attempt to relaunch instances that fail to launch. The user may also select how many times (e.g., three times) that the launch module 203 can attempt to relaunch instances that failed to launch.

In one embodiment, the rollback module 205 can initiate a rollback of the deployment if one or more instances fail to launch, according to a user selection. For example, a user may select that the rollback module 203 will initiate a rollback of the deployment if one or more instances fail to launch after a selected number of relaunch attempts are made. In another example, a user may select that the rollback module 203 will rollback a deployment if one or more instances fail to launch on the first attempt to launch. In one embodiment, the failed launch cloud 251 (i.e., the cloud where the launch attempt failed) will be recorded in a data store 250, such that the launch module 203 can avoid attempting another launch on a cloud where a launch failure occurred.

In one embodiment, the launch module 203 can initiate a launch of the deployment on another cloud meeting the prerequisites, according to a user selection. For example, the user can select that the launch module 203 can initiate a launch of the deployment on another cloud after the deployment has been rolled back from a failed launch attempt on a first cloud.

Figure 3:
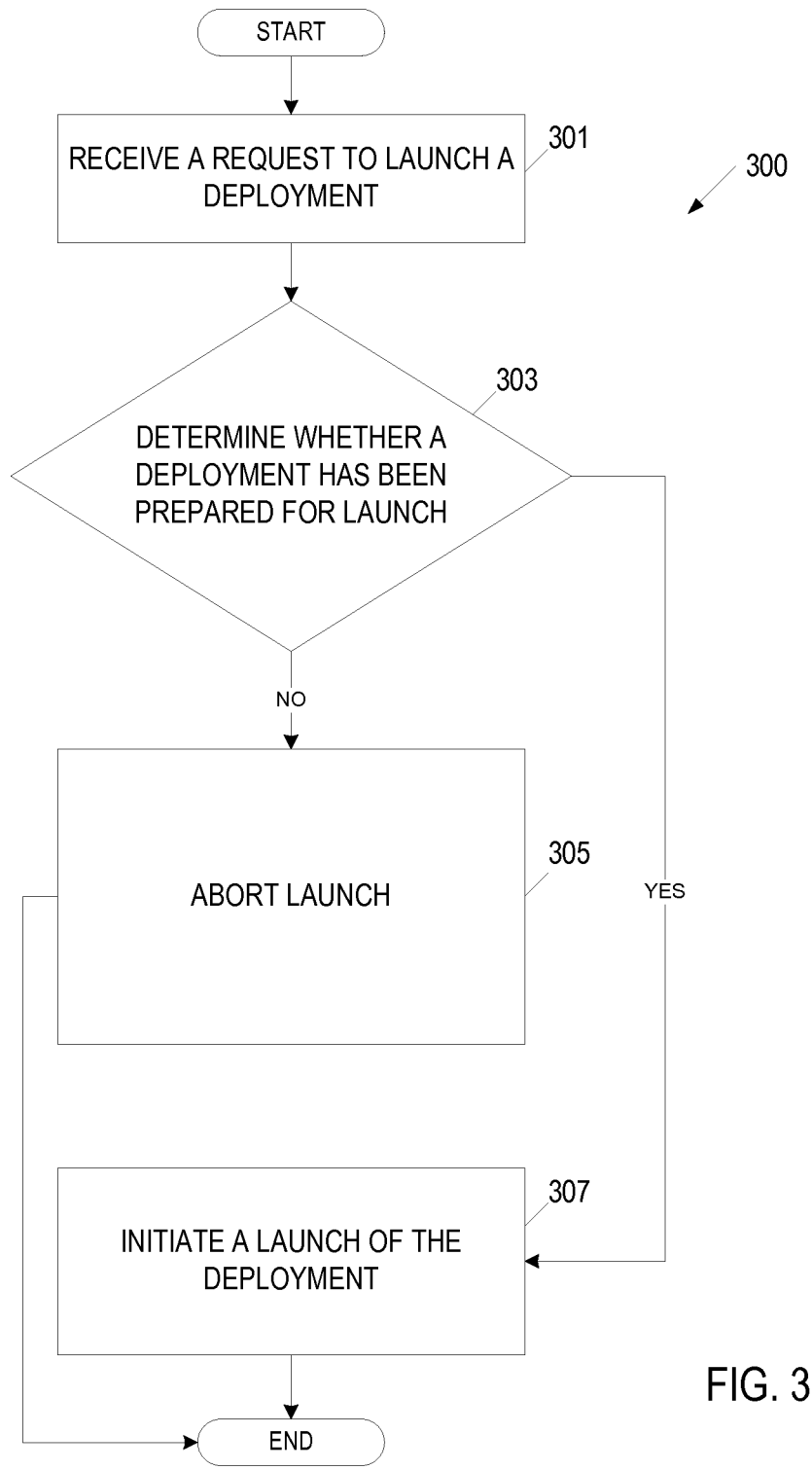
FIG. 3 is a flow diagram illustrating an embodiment of a method of cloud instance launching.

FIG. 3 is a flow diagram of an embodiment of a method 300 for cloud instance launching. The method 300 is performed by processing logic that may comprise hardware (circuitry, dedicated logic, etc.), software (such as is run on a general purpose computer system or a dedicated machine), or a combination of both. In one embodiment, the method 300 is performed by the launch server 200 of FIG. 2.

At block 301, launch server 200 receives a request to launch a deployment. At block 303, the pre-launch module 201 of the launch server 200 determines whether a deployment has been prepared for launch. For example, the pre-launch module 201 determines whether a deployment object and one or more instance objects have been properly created, whether launch parameters have been computed for all instances, and, optionally, whether a background job has been enqueued on a background job tool.

In one embodiment, a state attribute is associated with the deployment. Examples of state attributes can include new—deployment is created, but no instance has been launched yet; pending—at least one instance launch has been requested; failed—final state, deployment launch/shutdown failed; rollback_in_progress—an error occurred during launching an instance and there are already some launched instances which have to be stopped; rollback_failed—stopping of already launched instances failed; rollback_complete—stopping of already launched instances, now the deployment can be launched on another cloud; running—all instances were successfully launched and are in running state; incomplete—some instances are not running; shutting_down—shutdown was initiated; and stopped—all instances are stopped.

At block 303, once the deployment is created, the state of the deployment can be "new".

At block 305, the launch is aborted if the deployment has not been prepared for launch. For example, if the pre-launch module 201 determines that the deployment object or the instance objects are not properly created, that the launch parameters are not properly computed for all instances, or that the background job is not properly enqueued on the background job tool, then the launch is aborted. The deployment can now be prepared again for launch (e.g., a repeat preparation of the deployment can be initiated), according to a user selection, and the pre-launch server 201 can again determine whether the deployment has been properly prepared for launch.

At block 307, the launch module 203 of the launch server 200 initiates a launch of the deployment if the deployment has been properly prepared for launch. For example, if the pre-launch module 201 determines that the deployment object and the instance objects have been properly created, that the launch parameters are properly computed for all instances, and that the background job has been properly enqueued, then the launch module 203 initiates a deployment launch. Here, the state of the deployment is "pending".

Figure 4:
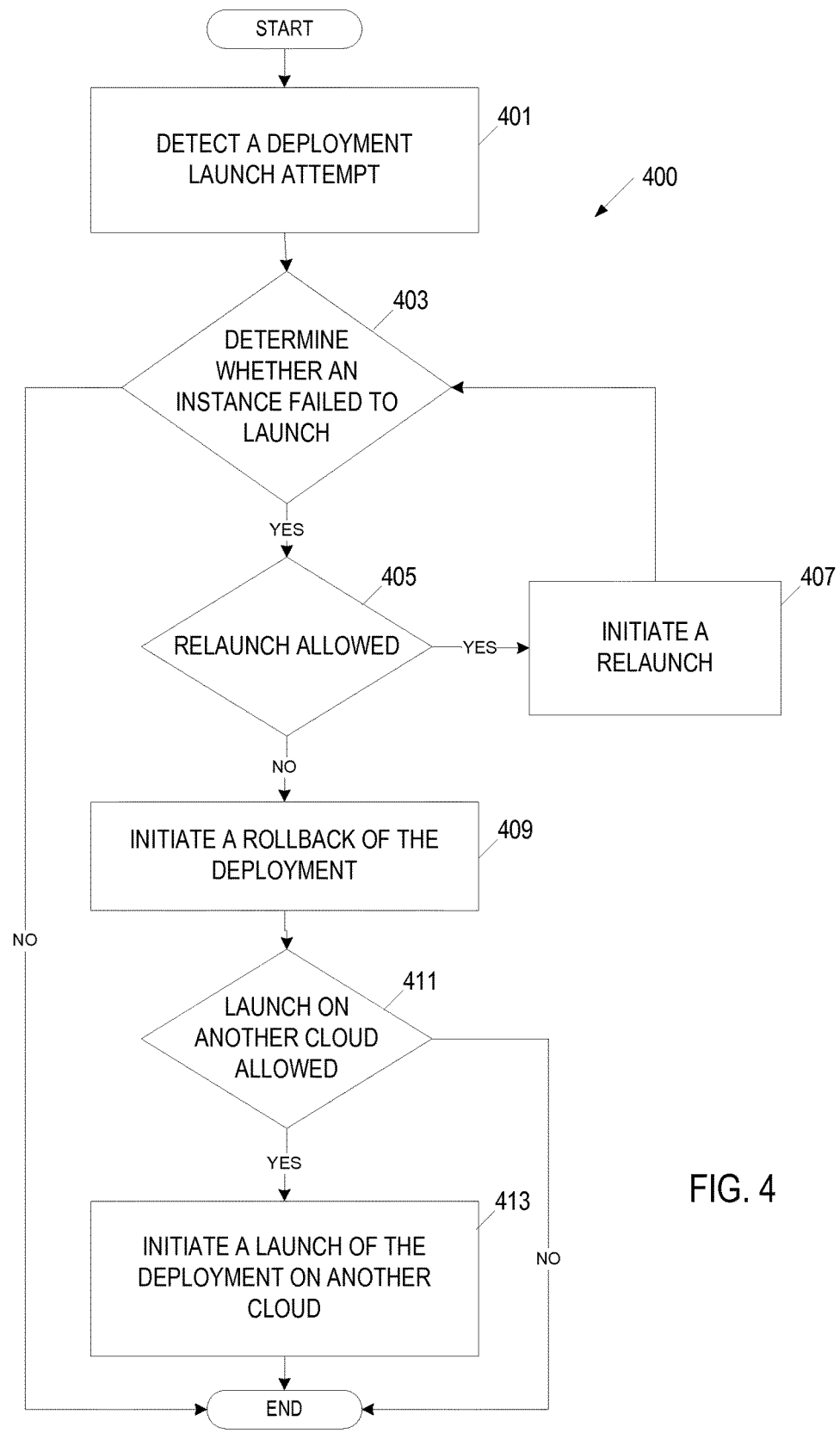
FIG. 4 is a flow diagram illustrating another embodiment of a method of cloud instance launching.

FIG. 4 is a flow diagram of an embodiment of a method 400 for launching a deployment on a cloud. The method 400 is performed by processing logic that may comprise hardware (circuitry, dedicated logic, etc.), software (such as is run on a general purpose computer system or a dedicated machine), or a combination of both. In one embodiment, the method 400 is performed by the launch server 200 of FIG. 2.

At block 401, the launch server 200 detects a deployment launch attempt. At block 403, the launch module 203 determines whether an instance failed to launch on the cloud. For example, the launch module 203 determines whether the deployment launch was performed by the background job tool, whether the instance launch parameters were uploaded to the configuration server, and whether the DC-API created an instance request for each instance that was sent. Here, the launch module 203 can determine whether the state of the deployment is "running".

At block 405, the launch module 203 determines whether a relaunch is allowed. At block 407, if a relaunch is allowed, the launch module 203 automatically initiates a relaunch of the deployment if an instance failed to launch. Here, one or more instances of a deployment have failed to launch properly, e.g., the state of the deployment is "failed" or "incomplete". For example, the instance launch parameters may have not properly uploaded or the cloud may not be functioning properly. In this case, the launch module 203 can attempt to relaunch the instance on the cloud, such that, e.g., the state of the deployment will be "pending".

In one embodiment, initiation of a relaunch is according to a user selection. In other words, a user can select whether a relaunch on the same cloud should be attempted, and, if so, how many relaunches should be attempted. For example, the deployment can have an attribute that holds the number of remaining relaunch attempts, which the user can select. For example, the user may select that a relaunch may be attempted two times. The launch module 203 can attempt to relaunch the instance at a constant interval (e.g., one minute) for instance which have a number of remaining relaunches greater than zero and decrease the number relaunches remaining with each attempted relaunch. In one embodiment, the number of attempted relaunches is displayed on a user interface.

The launch module 203 can determine whether an instance failed to relaunch on the cloud. For example, the instance launch parameters may have not properly uploaded or the cloud may not be functioning properly. For example, here, the state of the deployment is "failed" or "incomplete".

At block 409, if a relaunch is not allowed, the rollback module 205 automatically initiates a rollback of the deployment if an instance failed to relaunch. For example, here, the state of the deployment is "rollback_in_progress". In one embodiment, a rollback of the deployment after an instance fails to relaunch is according to a user selection. In other words, a user can select whether or not to initiate a rollback of a deployment upon failure of an instance to launch. In an example, once the rollback is successfully completed, the state of the deployment is "rollback_complete". The state can then be set to "new" for all instances or the instances can be deleted and recreated. If the rollback was unsuccessful, then the state of the deployment is "rollback_failed".

In one embodiment, if an error occurs when launching an instance, attempting to re-launching the instance can be more effective than rolling back deployment, particularly in situations where the deployment has multiple instances and some of the instances are already successfully running. However, in other situations attempting to relaunch prior to a rollback is less effective because a relaunch is unlikely to be successful in some error situations and each unsuccessful attempt to relaunch delays the launch process. Here, some users may prefer to not waste time attempting to relaunch on a cloud, particularly if there is another cloud available.

At block 411, the launch module 203 determines whether a launch on another cloud is allowed. At block 413, if a launch on another cloud is allowed, the launch module 203 automatically initiates a launch of the deployment on another cloud. In an example, here, the state of the deployment is "pending". In one embodiment, a launch of the deployment on another cloud is according to a user selection. In other words, a user can select whether to initiate a launch on another cloud after a rollback of a deployment. In an example, if the user selects that a launch on another cloud is not to be initiated, then the state of the deployment is "stopped".

In one example, in a deployment including three instances, the user has selected that after a first launch failure of a deployment on a cloud, the deployment should be rolled back, and a launch of the deployment should be initiated on another cloud. In this example, two instances launch properly, and the third instance fails to launch. Here, the launch on the first cloud is rolled back, such that the two launched instances should be stopped. A launch of the deployment is initiated on another cloud. In this example, all three instances successfully launch on the alternate cloud.

In another example, in a deployment including three instances, the user has selected that after a first launch failure of a deployment on a cloud, the deployment should be rolled back, and launch of the deployment should be initiated on a second cloud. In this example, two instances launch properly, and the third instance fails to launch. Here, the launch on the first cloud is rolled back, such that the two launched instances should be stopped. A launch of the deployment is initiated on the second cloud, where two instances launch properly, and the third instance fails to launch. In this example, the launch on the second cloud is also rolled back, and the deployment is destroyed. In one embodiment, a log entry for the failed launch can be created in a log.

In one embodiment, only certain state transitions are permitted. For example, allowed state transitions can include: new→pending; pending→running or rollback_in_progress or failed; rollback_in_progress→rollback_complete or rollback_failed; rollback_complete→pending or failed; running→shutting_down or incomplete; incomplete→running or shutting_down; and shutting_down→stopped. In this example, the deployment state can be used to track a deployment's history and determine what to do when there is a state change. For example, if an instance is stopped, deployment relaunch can be initiated if deployment was in rollback_in_progress state. Otherwise, the deployment stays stopped.

In one embodiment, the deployment state can be used for displaying a deployment's state on a user interface. For example, either "pending", "running", or "failed" can be determined for the state of all instances of a deployment displayed on the user interface. In an embodiment, the user can select whether state is displayed.

In one embodiment, as a result of instance launch-time parameters, there can be dependencies between instances. In one embodiment, the configuration server (e.g., Audrey) can coordinate launching such that all instances can be launched contemporaneously and the configuration server will launch any services which depend on values from other instances after these values are available.

In one embodiment, a user can select whether a rollback of a deployment will automatically occur if the deployment failed to launch, or the deployment failed to relaunch. In other words, a user can select that an incomplete deployment should be launched.

In one embodiment, when an instance of a deployment launch has been pending for more than a certain time (e.g., fifteen minutes), the launch is terminated and the deployment rollback is initiated. In one embodiment, a user can select the length of time that should pass before the launch is terminated.

In an example of one embodiment for a deployment launch, the launch server 200 creates a deployment and the deployment's instances. The launch server 200 computes the instance dependencies. The launch server 200 finds a match where all instances can be launched and invokes instance launch (e.g., via a background job on a background job tool). Upon occurrence of an error, deployment and instances are not created, the user stays on a deployment launch page, and the error including the reason why the launch was not successful is displayed.

In an example of one embodiment for instances launch, for each instance, the launch server 200 checks a quota and sends a launch request to DC-API. Upon occurrence of an error, the launch server initiates a deployment rollback.

If an instance fails on a provider side, the launch server 200 will try a certain number of retries to launch in an interval, and if the retries are unsuccessful, then a deployment rollback is invoked.

In an example of one embodiment for a deployment rollback, if all instances are "stopped" or "failed", then a deployment relaunch is invoked. Otherwise, the launch server 200 sends a stop request to any instances in a "pending" or "running" state.

In an example of one embodiment for a deployment relaunch, the launch server 200 finds a new match (i.e., another matching cloud) where all instances can be launched, which is not a match that was previously tried. If a match is found, then launch of the instances is invoked. Otherwise, if a match is not found, then the launch server 200 creates a log about the failed launch and destroys the deployment. In one example, the failed launch state can be displayed on the user interface.

Figure 5:
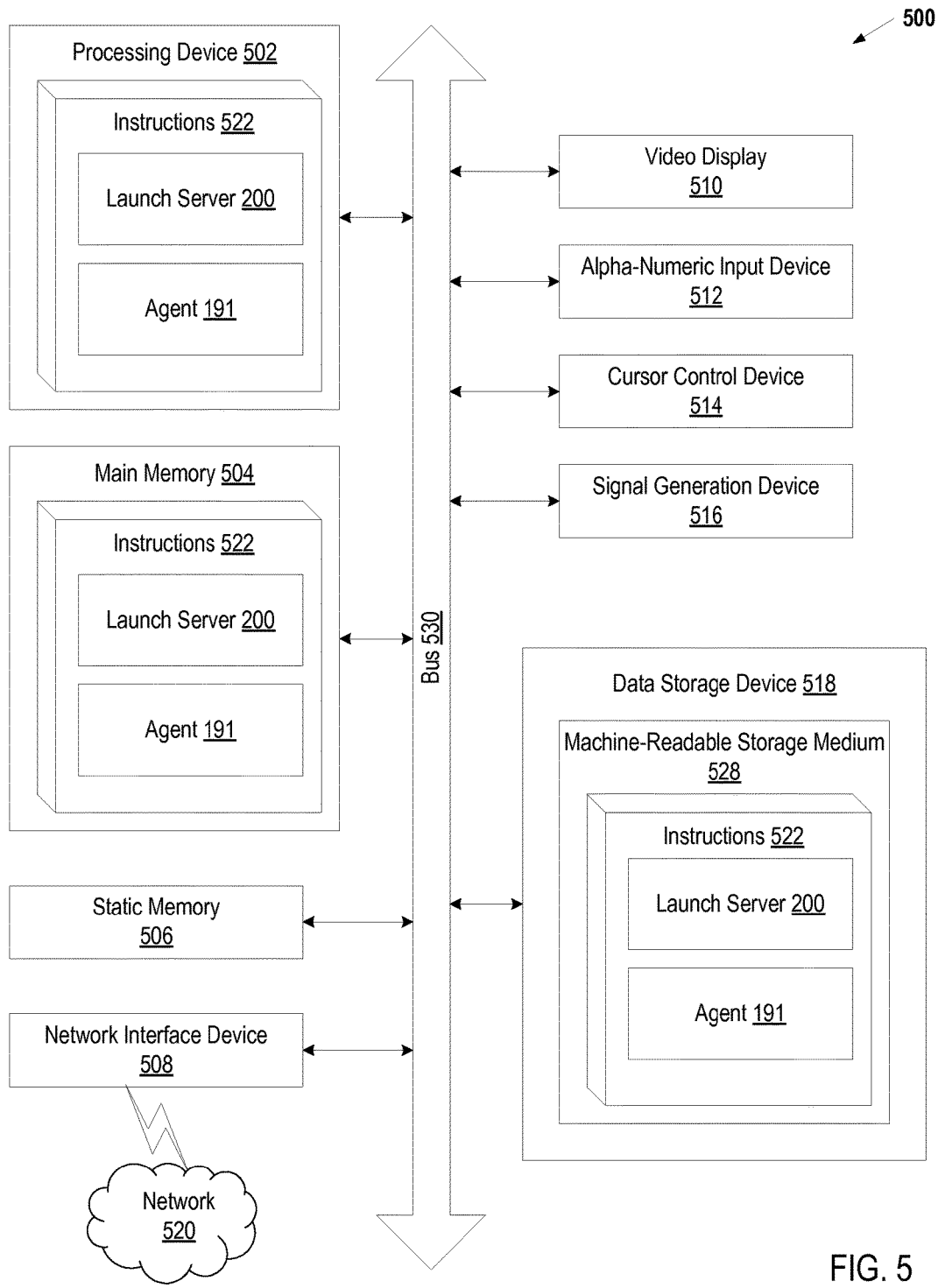
FIG. 5 is a block diagram of an exemplary computer system that may perform one or more of the operations described herein.

FIG. 5 illustrates a diagram of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable storage medium 528 on which is stored one or more sets of instructions 522 (e.g., software) embodying any one or more of the methodologies or functions described herein. The instructions 522 may also reside, completely or at least partially, within the main memory 504 and/or within the processor 502 during execution thereof by the computer system 500, the main memory 504 and the processor 502 also constituting computer-readable storage media. The instructions 522 may further be transmitted or received over a network 520 via the network interface device 508.

In one embodiment, the instructions 522 include instructions for a launch server (e.g., launch server 200 of FIG. 2), an agent 191 and/or a software library containing methods that call a launch server and/or agent. While the computer-readable storage medium 528 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "determining", "configuring", "searching", "sending," "receiving," "requesting," "providing," "generating," "adding," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain embodiments of the present invention also relate to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving a request to deploy a first virtual machine instance and a second virtual machine instance;
   determining, by a processing device of a server computer system, whether the deployment of the first virtual machine instance and the second virtual machine instance has been prepared for launch;
   upon determining that the deployment has not been prepared for launch, aborting a launch of the deployment;
   upon determining that the deployment has been prepared for launch, initiating a launch of the deployment of the first virtual machine instance and the second virtual machine instance; and
   upon determining that the first virtual machine instance has launched and the second virtual machine instance has not launched, initiating a rollback of the deployment of the first virtual machine instance and the second virtual machine instance, wherein the rollback comprises stopping the launched first virtual machine instance.

2. The method of claim 1, wherein upon determining that the first virtual machine instance has launched and the second virtual machine instance has not launched, a re-launch attempt is initiated prior to the rollback, and wherein at least one of the first virtual machine instance or the second virtual machine instance does not re-launch, and wherein the rollback is in response to the at least one of the first virtual machine instance or the second virtual machine instance not re-launching.

3. The method of claim 2, wherein the re-launch attempt comprises an attempt to re-launch the first virtual machine instance.

4. The method of claim 2, wherein a number of re-launch attempts are initiated prior to the rollback, and wherein the number of re-launch attempts is specified by a user.

5. The method of claim 2, wherein the deployment of the first virtual machine instance and the second virtual machine instance is prepared for launch on a first cloud, and wherein the re-launch attempt is initiated on a second cloud.

6. The method of claim 1, further comprising displaying a launch status according to a user selection.

7. The method of claim 5, further comprising determining whether the first cloud meets prerequisites for launching the deployment.

8. A system comprising:
   a memory to store a first virtual machine instance a second virtual machine instance; and
   a processing device operatively coupled to the memory to:
      receive a request to deploy the first virtual machine instance and the second virtual machine instance;
      determine whether the deployment of the first virtual machine instance and the second virtual machine instance has been prepared for launch;
      upon determining that the deployment has not been prepared for launch, aborting a launch of the deployment;

upon determining that the deployment has been prepared for launch, initiate a launch of the deployment of the first virtual machine instance and the second virtual machine instance; and upon determining that the first virtual machine instance has launched and the second virtual machine instance has not launched, initiate a rollback of the deployment of the first virtual machine instance and the second virtual machine instance, wherein the rollback comprises stopping the launched first virtual machine instance.

9. The system of claim 8, wherein upon determining that the first virtual machine instance has launched and the second virtual machine instance has not launched, the processing device is further to initiate a re-launch attempt prior to the rollback, and wherein at least one of the first virtual machine instance or the second virtual machine instance does not re-launch, and wherein the rollback is in response to the at least one of the first virtual machine instance or the second virtual machine instance not re-launching.

10. The system of claim 9, wherein the re-launch attempt comprises an attempt to re-launch the first virtual machine instance.

11. The system of claim 9, wherein the processing device is further to initiate a number of re-launch attempts prior to the rollback, and wherein the number of re-launch attempts is specified by a user.

12. The system of claim 9, wherein the deployment of the first virtual machine instance and the second virtual machine instance is prepared for launch on a first cloud, and wherein the re-launch attempt is initiated on a second cloud.

13. The system of claim 8, wherein the processing device is further to display a launch status according to a user selection.

14. The system of claim 12, wherein the processing device is further to determine whether the first cloud meets prerequisites for launching the deployment.

15. A non-transitory computer-readable storage medium including instructions that, when executed by a processing device of a computer system, cause the processing device to:
receive a request to deploy a first virtual machine instance and a second virtual machine instance;
determine, by the processing device, whether the deployment of the first virtual machine instance and the second virtual machine instance has been prepared for launch;

upon determining that the deployment has not been prepared for launch, abort a launch of the deployment;
upon determining that the deployment has been prepared for launch, initiate a launch of the deployment of the first virtual machine instance and the second virtual machine instance; and
upon determining that the first virtual machine instance has launched and the second virtual machine instance has not launched, initiating a rollback of the deployment of the first virtual machine instance and the second virtual machine instance, wherein the rollback comprises stopping the launched first virtual machine instance.

16. The non-transitory computer-readable storage medium of claim 15 wherein upon determining that the first virtual machine instance has launched and the second virtual machine instance has not launched, the instructions further cause the processing device to initiate a re-launch attempt prior to the rollback, and wherein at least one of the first virtual machine instance or the second virtual machine instance does not re-launch, and wherein the rollback is in response to the at least one of the first virtual machine instance or the second virtual machine instance not re-launching.

17. The non-transitory computer-readable storage medium of claim 16, wherein the re-launch attempt comprises an attempt to re-launch the first virtual machine instance.

18. The non-transitory computer-readable storage medium of claim 16, wherein the instructions further cause the processing device to initiate a number of re-launch attempts prior to the rollback, and wherein the number of re-launch attempts is specified by a user.

19. The non-transitory computer-readable storage medium of claim 16, wherein the deployment of the first virtual machine instance and the second virtual machine instance is prepared for launch on a first cloud, and wherein the re-launch attempt is initiated on a second cloud.

20. The non-transitory computer-readable storage medium of claim 19, wherein the instructions further cause the processing device to determine whether the first cloud meets prerequisites for launching the deployment.

* * * * *